US012538866B2

(12) United States Patent
Childs

(10) Patent No.: US 12,538,866 B2
(45) Date of Patent: Feb. 3, 2026

(54) AGRICULTURAL DISC MOWER WITH KNIVES, A SPRING PLATE, AND A KNIFE NUT THAT ACTS AS A STOP

(71) Applicant: CNH Industrial America LLC, New Holland, PA (US)

(72) Inventor: Albert Childs, Meadville, PA (US)

(73) Assignee: CNH Industrial America LLC, New Holland, PA (US)

( * ) Notice: Subject to any disclaimer, the term of this patent is extended or adjusted under 35 U.S.C. 154(b) by 542 days.

(21) Appl. No.: 18/080,418

(22) Filed: Dec. 13, 2022

(65) Prior Publication Data
US 2024/0188488 A1  Jun. 13, 2024

(51) Int. Cl.
A01D 34/66 (2006.01)

(52) U.S. Cl.
CPC ......... *A01D 34/661* (2013.01); *A01D 34/664* (2013.01)

(58) Field of Classification Search
CPC .. A01D 34/661; A01D 34/664; A01D 34/733; A01D 34/736
See application file for complete search history.

(56) References Cited

U.S. PATENT DOCUMENTS

| 6,829,878 B1 | 12/2004 | Hoffman |
| 9,545,053 B2 | 1/2017 | Fay, II |
| 10,820,499 B2 | 11/2020 | Figgins |
| 2013/0247530 A1* | 9/2013 | Heinrich ............. A01D 34/733 56/295 |
| 2015/0305235 A1* | 10/2015 | Fay, II ................ A01D 34/733 56/295 |

FOREIGN PATENT DOCUMENTS

| EP | 0 115 853 B1 | 3/1987 |
| EP | 2912935 A1 | 9/2015 |
| EP | 2939517 A1 | 11/2015 |

OTHER PUBLICATIONS

Extended European Search Report for EP Application No. 23216464.0 dated May 14, 2024 (eight pages).

* cited by examiner

*Primary Examiner* — Nicole Coy
*Assistant Examiner* — Jennifer A Railey
(74) *Attorney, Agent, or Firm* — Buchanan Ingersoll & Rooney PC

(57) ABSTRACT

A disc cutter for an agricultural implement includes: a mounting bar including a bar opening; a bolt disposed in the bar opening; a knife nut including a nut opening in which the bolt is disposed; a knife including a knife opening in which the knife nut is disposed, the knife being configured to rotate about a rotation axis defined by the knife nut; and a spring plate biased towards the mounting bar and having a recess formed therein. The knife nut has a portion held in the recess and a bottom of the portion acts as a stop against movement of the spring plate towards the mounting bar.

21 Claims, 4 Drawing Sheets

AGRICULTURAL DISC MOWER WITH KNIVES, A SPRING PLATE, AND A KNIFE NUT THAT ACTS AS A STOP

FIELD OF THE INVENTION

The present invention pertains to agricultural implements and, more specifically, to disc cutters for agricultural mowing devices.

BACKGROUND OF THE INVENTION

Mowers and mower conditioners are often employed to cut crop material, such as hay or grass, and deposit the cut crop into windrows in a field. For cutting smaller fields, a single pull-type mower or mower conditioner may be attached to the rear of an agricultural driving vehicle. For cutting large fields, the driving vehicle may push a front mounted mower or mower conditioner and optionally tow an additional rear mounted mower or mower conditioner.

A typical mower generally includes a frame, a hitch coupled to the vehicle, and a cutter bar such as a sickle bar or rotary disc cutter bar for severing the crop from the field. The mower may further include other elements such as a reel to assist crop feeding, an auger or belts to convey crop to a central discharge point, and a flail or set of rollers for conditioning crop as it is ejected rearwardly out of the mower. A disc cutter bar generally includes multiple juxtaposed cutterheads for cutting the standing crop. Each cutterhead may consist of a rotating disc with diametrically opposed cutting blades or knives affixed to the body of the disc.

The knives of a cutter bar are known wear items that are intended to be replaced or repaired with some frequency. Knife mounting assemblies that allow for quickly changing the knives are known. However, known knife mounting assemblies have some drawbacks that frequently occur when the knives rotate in and out of the cutting position to protect the knives from obstacles during operation.

What is needed in the art is a way to quickly change knives that overcomes some of the disadvantages associated with known mounting assemblies.

SUMMARY OF THE INVENTION

Exemplary embodiments disclosed herein provide disc cutters with a spring plate that has a recess formed therein that holds a portion of a knife nut to which a knife is mounted, with a bottom of the knife nut acting as a stop against movement of the spring plate.

In some exemplary embodiments provided according to the present disclosure, a disc cutter for an agricultural implement includes: a mounting bar including a bar opening; a bolt disposed in the bar opening; a knife nut including a nut opening in which the bolt is disposed; a knife including a knife opening in which the knife nut is disposed, the knife being configured to rotate about a rotation axis defined by the knife nut; and a spring plate biased towards the mounting bar and having a recess formed therein. The knife nut has a portion held in the recess and a bottom of the portion acts as a stop against movement of the spring plate towards the mounting bar.

In some exemplary embodiments provided according to the present disclosure, a cutter bar for an agricultural implement includes a frame and a plurality of disc cutters carried by the frame. At least one of the disc cutters includes: a mounting bar including a bar opening; a bolt disposed in the bar opening; a knife nut including a nut opening in which the bolt is disposed; a knife including a knife opening in which the knife nut is disposed, the knife being configured to rotate about a rotation axis defined by the knife nut; and a spring plate biased towards the mounting bar and having a recess formed therein. The knife nut has a portion held in the recess and a bottom of the portion acts as a stop against movement of the spring plate towards the mounting bar.

In some exemplary embodiments provided according to the present disclosure, an agricultural mowing assembly includes an agricultural vehicle and an agricultural implement coupled to the agricultural vehicle. The agricultural implement has a cutter bar that includes a frame and a plurality of disc cutters carried by the frame. At least one of the disc cutters includes: a mounting bar including a bar opening; a bolt disposed in the bar opening; a knife nut including a nut opening in which the bolt is disposed; a knife including a knife opening in which the knife nut is disposed, the knife being configured to rotate about a rotation axis defined by the knife nut; and a spring plate biased towards the mounting bar and having a recess formed therein. The knife nut has a portion held in the recess and a bottom of the portion acts as a stop against movement of the spring plate towards the mounting bar.

One advantage that may be realized by exemplary embodiments provided according to the present disclosure is that the bottom of the portion acting as the stop against movement of the spring plate can prevent the spring plate from contacting the knife and causing the knife to bind, which allows the knife to freely rotate in when striking an object and freely rotate back out to a cutting position when there is no obstacle.

Another advantage that may be realized by exemplary embodiments provided according to the present disclosure is that the knife can be changed as quickly as known quick change knife mounting assemblies.

Yet another advantage that may be realized by exemplary embodiments provided according to the present disclosure is that the knife can be changed with known quick change knife tools.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

The terms "forward", "rearward", "left" and "right", when used in connection with the agricultural vehicle or mowing device and/or components thereof are usually determined with reference to the direction of forward operative travel, but they should not be construed as limiting. The terms "longitudinal" and "transverse" are determined with reference to the fore-and-aft direction of the agricultural vehicle or mowing device and are equally not to be construed as limiting. The terms "downstream" and "upstream" are determined with reference to the intended direction of crop material flow during operation, with "downstream" being analogous to "rearward" and "upstream" being analogous to "forward." As used herein, the term "mowing device" may refer to any agricultural cutting device that severs crop from the field, including a mower, a mower conditioner, or a cutter bar for a forage harvester or combine.

Figure 1:
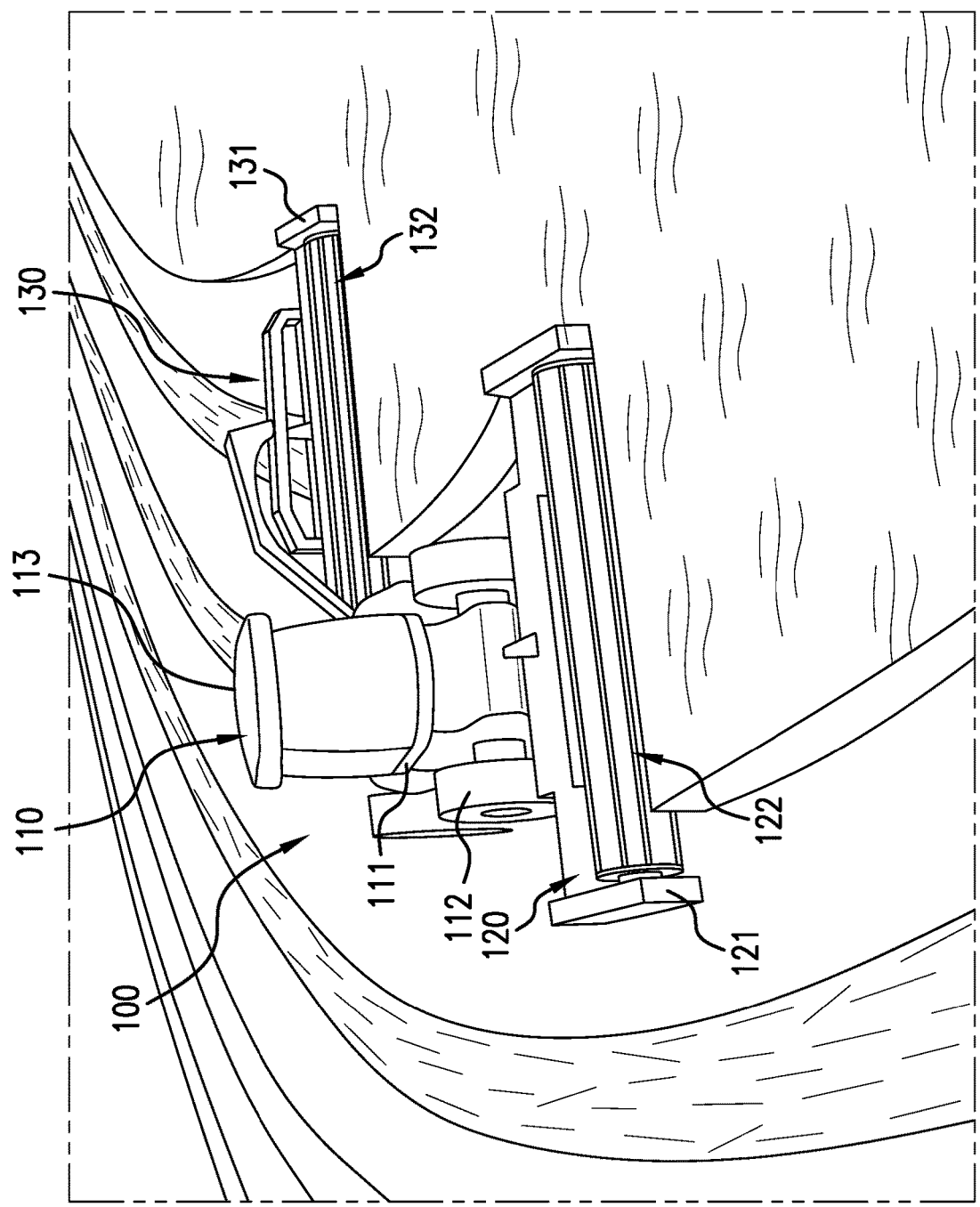
FIG. 1 illustrates a perspective view of an exemplary embodiment of an agricultural mowing assembly including an agricultural vehicle and an agricultural implement provided according to the present disclosure.
Figure 2:
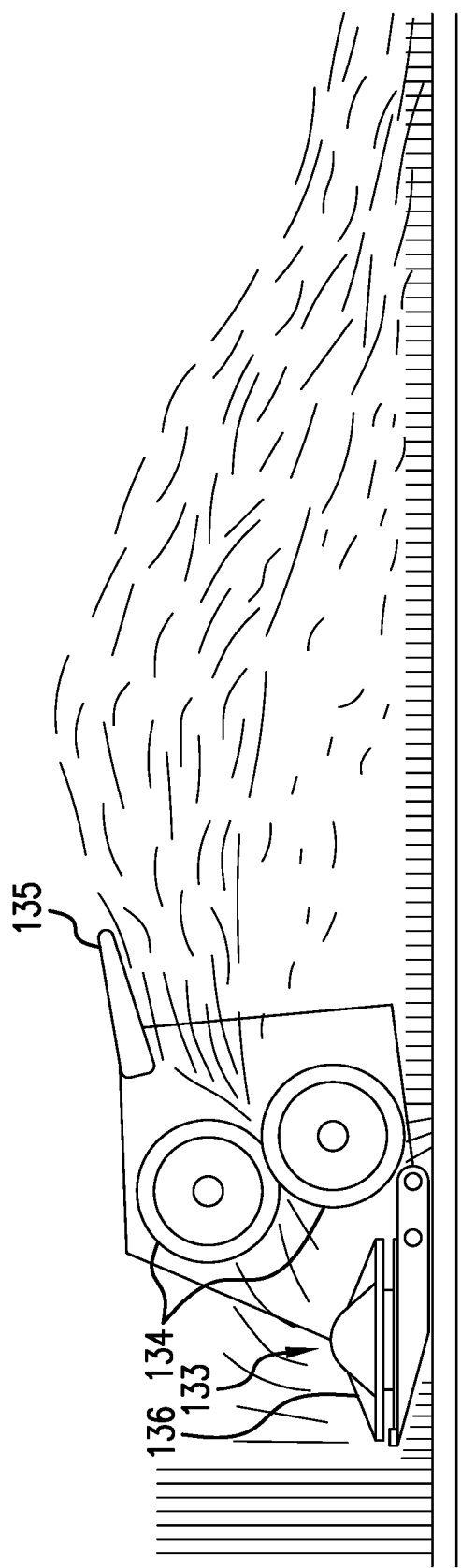
FIG. 2 illustrates a side sectional view of the agricultural implement of FIG. 1.

Referring now to the drawings, and more particularly to FIGS. 1-2, there is shown an agricultural mowing assembly 100 which includes an agricultural vehicle 110 and at least one agricultural implement illustrated in the form of two mowing devices 120, 130 coupled to the agricultural vehicle 110. The agricultural mowing assembly 100 may include tandem front and rear mowing devices 120, 130, which operate in tandem to cut crop from the field. It should be appreciated that while only two mowers 120, 130 are illustrated and described herein, the present disclosure is equally applicable to mowing assemblies that incorporate only one mowing device or more than two mowing devices.

The agricultural vehicle 110 generally includes a chassis 111, a prime mover, wheels and/or tracks 112, and a cab 113 for housing the operator. The chassis 111 may at least partially carry the front and rear mowing devices 120, 130. The vehicle 110 can be in the form of a tractor, self-propelled windrower, or any other desired agricultural vehicle.

The front and rear mowing devices 120, 130 are connected to the chassis 111 of the agricultural vehicle 110. The front mowing device 120, for example, may be centrally mounted onto the driving vehicle 110 such that the agricultural vehicle 110 carries the front mowing device 120. The rear mowing device 130 may be coupled to a tongue coupler on the chassis 111 by a pivotable tongue that can change the angular position of the rear mowing device 130 relative to the forward direction of travel. As shown, the mowing devices 120, 130 are in the form of mower conditioners; however, the mowing devices 120, 130 can be in the form of any desired mowing devices such as mowers, windrowers, cutter bars, or windrow inverters. Each mowing device 120, 130 may include a frame 121, 131, a reel 122, 132 with tines rotatably connected to the frame 121, 131, a cutter bar 133, a conditioner 134, e.g. at least one flail conditioner or at least two conditioning rollers 134, and/or a crop gate 135, e.g. swath gate and/or windrow forming shields, for directing the crop material out of the mowing device 120, 130 and onto the field in a windrow or swath (as shown in FIG. 2 with respect to the rear mowing device 130). The illustrated cutter bar 133 is in the form of a rotary disc cutter bar 133 with multiple disc cutters 136 carried by a frame of the cutter bar 133.

Figure 3:
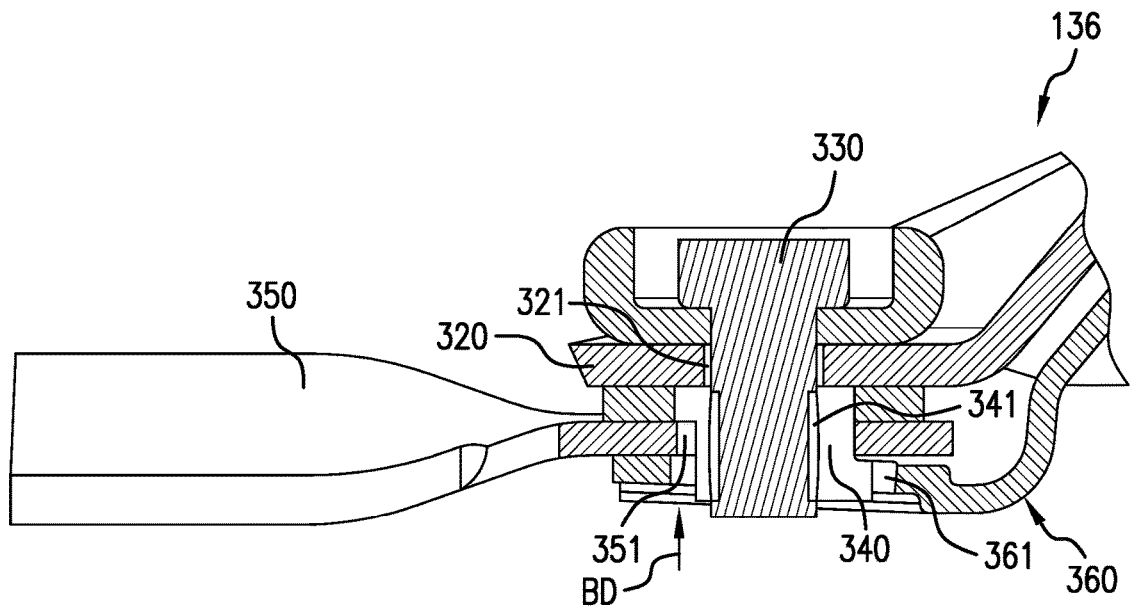
FIG. 3 illustrates a cross-sectional view of a portion of a known disc cutter including a knife mounted by a spring plate.

Referring now to FIG. 3, one of the disc cutters 136 is illustrated with a known knife 350 coupled thereto. The disc cutter 136 includes a mounting bar 320 with a bar opening 321 formed therein, a bolt 330 disposed in the bar opening 321, a knife nut 340 having a nut opening 341 in which the bolt 330 is disposed, a knife 350 having a knife opening 351 in which the knife nut 340 is disposed, and a spring plate 360 biased towards the mounting bar 320. The spring plate 360 has an opening 361 formed therein in which the bolt 330 and the knife nut 340 are held. The spring plate 360 is biased in a biasing direction BD upwards towards the mounting bar 320 to force the knife 350 towards the mounting bar 320 so the knife 350 stays in place.

It has been found that the knife 350 of FIG. 3 may be prone to sticking after hitting an object and pivoting about a pivot axis defined by the knife nut 340 out of the cutting position. Particularly, it has been discovered that the spring plate 360 has a tendency to translate towards the mounting bar 320 and come into contact with the knife 350, causing the knife 350 to bind. When this occurs, the knife 350 can no longer properly rotate back to the cutting position unless the spring plate 360 is deformed back to its original state, rendering the knife ineffective until it is freed. The spring plate 360 bearing on the knife 350 also creates resistance to the knife 350 rotating out of the way when striking an object, which can increase the risk of the knife 350 breaking when hitting the object due to the increased amount of force needed to swing out the knife 350.

Figure 4:
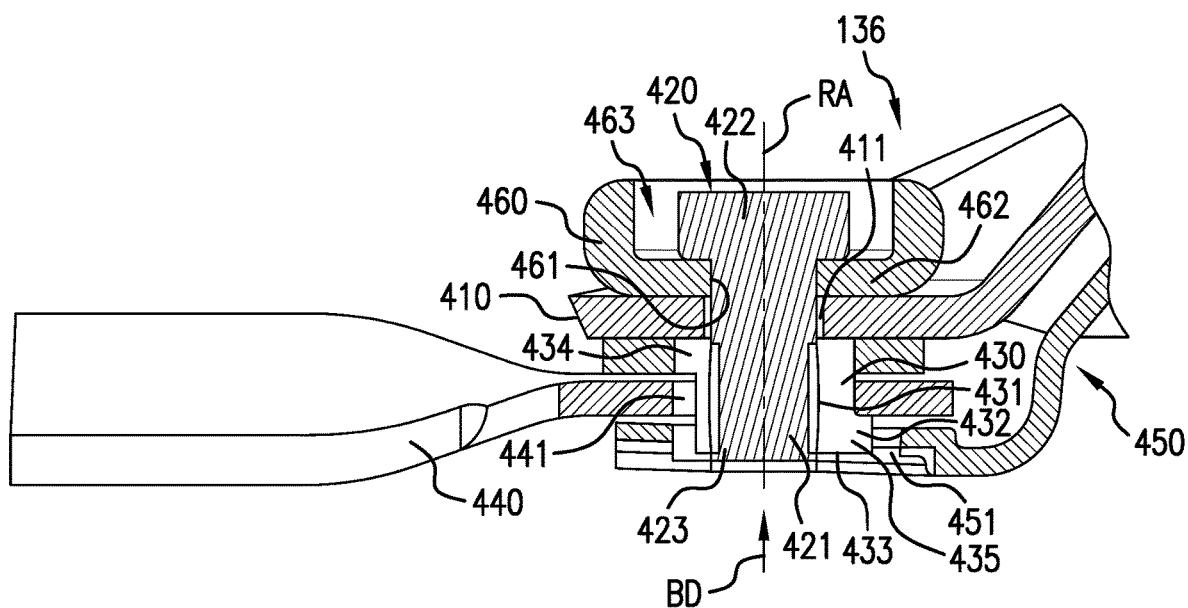
FIG. 4 illustrates a cross-sectional view of a portion of a disc cutter provided according to the present disclosure that includes a spring plate with a recess and a knife nut having a portion held in the recess and a bottom of the portion acting as a stop for the spring plate.
Figure 5:
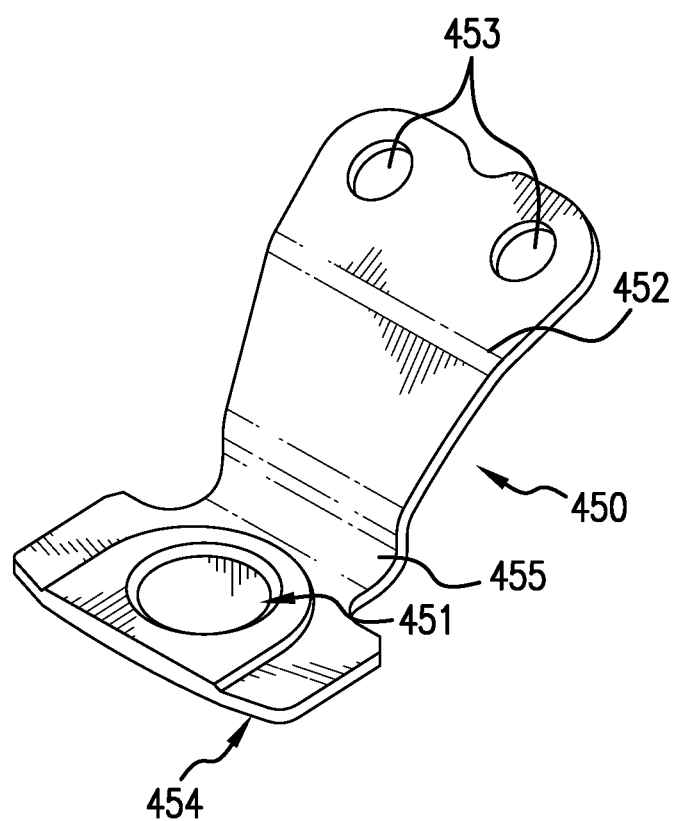
FIG. 5 illustrates a perspective view of the spring plate of FIG. 4 separate from the disc cutter.

To address some of the previously described issues with mounting knives, and referring now to FIGS. 4-5, an exemplary embodiment of a disc cutter 136 provided according to the present disclosure is illustrated. Similarly to the disc cutter of FIG. 3, the disc cutter 136 of FIG. 4 includes a mounting bar 410 with a bar opening 411 formed therein, a bolt 420 disposed in the bar opening 411, a knife nut 430 having a nut opening 431 in which the bolt 420 is disposed, a knife 440 having a knife opening 441 in which the knife nut 430 is disposed, and a spring plate 450, which may be carried by the mounting bar 410. Similarly to the previously described knife 350, the knife 440 is configured to rotate about a rotation axis RA defined by the knife nut 430 to move, for example, between a cutting position and a retracted position. While only one of the disc cutters 136 is illustrated in FIG. 4, it should be appreciated that two or more of the disc cutters 136, such as all of the disc cutters 136, of the cutter bar 133 may be similar to the disc cutter 136 illustrated in FIG. 4.

Unlike the previously described spring plate 360 of FIG. 3, the spring plate 450 provided according to the present disclosure includes a recess 451 in which a portion 432 of the knife nut 430 is held. As opposed to the opening 361 of the spring plate 360, the recess 451 of the spring plate 450 is at least partially closed at one end so a bottom 433 of the portion 432 of the knife nut 430 acts as a stop against movement of the spring plate 450 towards the mounting bar 410. Since the recess 451 is at least partially closed at one end, and in some embodiments fully closed, the contact between the bottom of the recess 451 and the bottom 433 of the portion 432 prevents the spring plate 450 from translating in the biasing direction BD up the knife nut 430 and the bolt 420 towards the mounting bar 410, which prevents the spring plate 450 from contacting the knife 440. In this respect, the spring plate 450 including the recess 451, rather than an opening, prevents the spring plate 450 from coming into contact with the knife 440 and binding the knife 440 to prevent the knife 440 from rotating back to the cutting position.

In some embodiments, the knife nut 430 is an eccentric knife nut including a first section 434 held on one side of the knife 440 and a second section 435 held on an opposite side of the knife 440. The second section 435 differs from the first section 434 so the knife nut 430 is not center symmetrical.

The first section 434 may, for example, bear against the mounting bar 410 to hold the knife 440 in place due to the biasing force of the spring plate 450. The second section 435, on the other hand, may include the portion 432 of the knife nut 430 that is held in the recess 451. The second section 435 may, for example, be shaped so the bottom 433 of the portion 432 contacts more than one surface of the recess 451 to reduce the risk of the portion 432 coming out of the recess 451 during operation. In some embodiments, the portion 432 and the second section 435 may be sized and shaped so the bottom 433 is press fit into the recess 451.

In some embodiments, a portion 421 of the bolt 420 is held in the recess 451. The bolt 420 may, for example, include a bolt head 422 and a bolt bottom 423 opposite the bolt head 422 that includes the portion 421 held in the recess 451. The portion 421 of the bolt 420 may extend entirely through the nut opening 431 so the bolt bottom 423 contacts a surface of the recess 451, as illustrated in FIG. 4. In some embodiments, the bolt bottom 423 passes through an opening formed in the recess 451 without the knife nut 430 passing through the recess 451. In some embodiments, a shield 460 is provided that includes a shield opening 461 in which a portion of the bolt 420 is held. The shield opening 461 may be formed in a section 462 of the shield 460 that is disposed between the bolt head 422 and a surface of the mounting bar 410. The section 462 may bear on the surface of the mounting bar 410, especially when the bolt 420 is tightened. The shield 460 may include a cavity 463 that partially surrounds the bolt head 422 to prevent the bolt head 422 from being worn down during operation.

Referring specifically now to FIG. 5, the spring plate 450 is illustrated by itself. As illustrated, the spring plate 450 may include a mounting section 452 with one or more mounting holes 453 for mounting the spring plate 450, e.g., to the mounting bar 410, with one or more fasteners. The mounting section 452 may be coupled to a recess section 454, which includes the recess 451, by a bend 455. The spring plate 450 is formed of a material that allows the spring plate 450 to reversibly move in the biasing direction BD, both towards and away from the mounting bar 410, to mount and remove the knife 440. The spring plate 450 may, for example, be formed of so-called spring steel or other similar materials.

To mount the knife 440, the knife 440 is mounted to the knife nut 430, which is then contacted by the spring plate 450. The knife nut 430 may be placed on the bolt 420 so the bolt 420 is held in the nut opening 431 to couple the knife nut 430 to the mounting bar 410. The spring plate 450 can be temporarily moved away from the mounting bar 410 by pushing and holding down the spring plate 450, with a tool or otherwise. The knife 440 can be placed on the knife nut 430 so the knife nut 430 is disposed in the knife opening 441. The spring plate 450 may then be released so the spring plate 450 moves in the biasing direction BD back towards the mounting bar 410 such that the portion 432 of the knife nut 430 is held in the recess 451, at which point the knife 440 should be securely mounted and ready for operation.

From the foregoing, it should be appreciated that the spring plate 450 provided according to the present disclosure allows knives 440 to be quickly mounted to the disc cutter 136 while reducing the risk of the knives 440 binding due to contact between the spring plate 450 and the knife 440. The binding risk is reduced by the knife nut 430 having the portion 432 held in the at least partially closed recess 451 of the spring plate 450, which allows the bottom 433 of the portion 432 to act as a stop against movement of the spring plate 450 towards the mounting bar 410 and prevent the spring plate 450 from contacting the knife 440. Therefore, the spring plate 450 provided according to the present disclosure reduces the risk of the knives binding during operation while maintaining the quick and convenient mounting procedure of known assemblies.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. A disc cutter for an agricultural implement, comprising:
   a mounting bar comprising a bar opening;
   a bolt disposed in the bar opening;
   a knife nut comprising a nut opening in which the bolt is disposed;
   a knife comprising a knife opening in which the knife nut is disposed, the knife being configured to rotate about a rotation axis defined by the knife nut; and
   a spring plate biased towards the mounting bar and comprising a recess formed therein, wherein the knife nut comprises a portion held in the recess and a bottom of the portion acts as a stop against movement of the spring plate towards the mounting bar,
   wherein the bottom of the portion prevents the spring plate from contacting the knife.

2. The disc cutter of claim 1, wherein the knife nut is an eccentric knife nut comprising a first section held on one side of the knife and a second section held on an opposite side of the knife that differs from the first section.

3. The disc cutter of claim 2, wherein the first section of the knife nut bears against the mounting bar.

4. The disc cutter of claim 2, wherein the second section of the knife nut comprises the portion of the knife nut held in the recess.

5. The disc cutter of claim 2, wherein the first section is disposed at an elevation above the knife and the second section is disposed at an elevation below the knife.

6. The disc cutter of claim 2, wherein the first section is arranged on a first side of the rotation axis and the second section is disposed on a second side of the rotation axis that is opposite the first side of the rotation axis, and wherein the first and second sections differ such that the knife nut is not center symmetrical.

7. The disc cutter of claim 1, wherein a portion of the bolt is held in the recess.

8. The disc cutter of claim 7, wherein the bolt comprises a bolt head and a bolt bottom opposite of the bolt head, the bolt bottom comprising the portion of the bolt held in the recess.

9. The disc cutter of claim 1, wherein the spring plate is spaced apart from the knife by a gap that extends in a direction along the rotation axis.

10. A cutter bar for an agricultural implement, comprising:
    a frame; and
    a plurality of disc cutters carried by the frame, at least one of the disc cutters comprising:
    a mounting bar comprising a bar opening;
    a bolt disposed in the bar opening;
    a knife nut comprising a nut opening in which the bolt is disposed;

a knife comprising a knife opening in which the knife nut is disposed, the knife being configured to rotate about a rotation axis defined by the knife nut; and a spring plate carried by the frame, biased towards the mounting bar, and comprising a recess formed therein, wherein the knife nut comprises a portion held in the recess and a bottom of the portion acts as a stop against movement of the spring plate towards the mounting bar wherein the bottom of the portion prevents the spring plate from contacting the knife.

11. The cutter bar of claim 10, wherein the knife nut is an eccentric knife nut comprising a first section held on one side of the knife and a second section held on an opposite side of the knife that differs from the first section.

12. The cutter bar of claim 11, wherein the first section of the knife nut bears against the mounting bar.

13. The cutter bar of claim 11, wherein the second section of the knife nut comprises the portion of the knife nut held in the recess.

14. The cutter bar of claim 10, wherein a portion of the bolt is held in the recess.

15. The cutter bar of claim 14, wherein the bolt comprises a bolt head and a bolt bottom opposite of the bolt head, the bolt bottom comprising the portion of the bolt held in the recess.

16. An agricultural mowing assembly, comprising:

an agricultural vehicle; and an agricultural implement coupled to the agricultural vehicle, the agricultural implement comprising a cutter bar, the cutter bar comprising:

a frame; and a plurality of disc cutters carried by the frame, at least one of the disc cutters comprising:

a mounting bar comprising a bar opening;

a bolt disposed in the bar opening;

a knife nut comprising a nut opening in which the bolt is disposed;

a knife comprising a knife opening in which the knife nut is disposed, the knife being configured to rotate about a rotation axis defined by the knife nut; and a spring plate carried by the frame, biased towards the mounting bar, and comprising a recess formed therein, wherein the knife nut comprises a portion held in the recess and a bottom of the portion acts as a stop against movement of the spring plate towards the mounting bar, wherein the bottom of the portion prevents the spring plate from contacting the knife.

17. The agricultural mowing assembly of claim 16, wherein the knife nut is an eccentric knife nut comprising a first section held on one side of the knife and a second section held on an opposite side of the knife that differs from the first section.

18. The agricultural mowing assembly of claim 17, wherein the first section of the knife nut bears against the mounting bar.

19. The agricultural mowing assembly of claim 16, wherein the second section of the knife nut comprises the portion of the knife nut held in the recess.

20. The agricultural mowing assembly of claim 16, wherein a portion of the bolt is held in the recess.

21. The agricultural mowing assembly of claim 20, wherein the bolt comprises a bolt head and a bolt bottom opposite of the bolt head, the bolt bottom comprising the portion of the bolt held in the recess.

* * * * *